(12) United States Patent
Long et al.

(10) Patent No.: US 12,351,293 B1
(45) Date of Patent: *Jul. 8, 2025

(54) PROPELLER GROUND STOP MECHANISM

(71) Applicant: Wisk Aero LLC, Mountain View, CA (US)

(72) Inventors: Geoffrey Alan Long, Montara, CA (US); Pieter DePape, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,503

(22) Filed: Oct. 28, 2024

Related U.S. Application Data

(63) Continuation of application No. 18/504,869, filed on Nov. 8, 2023, now Pat. No. 12,157,555, which is a continuation of application No. 17/480,102, filed on Sep. 20, 2021, now Pat. No. 11,845,532.

(60) Provisional application No. 63/081,261, filed on Sep. 21, 2020.

(51) Int. Cl.
*B64C 11/00* (2006.01)

(52) U.S. Cl.
CPC ............ *B64C 11/00* (2013.01); *B64C 11/002* (2013.01)

(58) Field of Classification Search
CPC ............................... B64C 11/002; B64C 11/00
See application file for complete search history.

(56) References Cited

U.S. PATENT DOCUMENTS

| | | | |
|---|---|---|---|
| 2,375,152 | A | 5/1945 | Turner |
| 3,109,517 | A | 11/1963 | Butler et al. |
| 5,104,291 | A | 4/1992 | Morrison |
| 11,845,532 | B1 | 12/2023 | Long et al. |
| 12,157,555 | B1 * | 12/2024 | Long .................... B64C 11/002 |

OTHER PUBLICATIONS

U.S. Appl. No. 17/480,102 , "Non Final Office Action", May 4, 2023, 13 pages.
U.S. Appl. No. 17/480,102 , "Notice of Allowance", Aug. 8, 2023, 6 pages.
U.S. Appl. No. 18/504,869 , "Non-Final Office Action", Apr. 24, 2024, 19 pages.
U.S. Appl. No. 18/504,869 , "Notice of Allowance", Aug. 5, 2024, 9 pages.

* cited by examiner

*Primary Examiner* — Michael L Sehn
(74) *Attorney, Agent, or Firm* — Kilpatrick Townsend & Stockton LLP

(57) ABSTRACT

Embodiments provide a propeller ground stop mechanism configured to keep an unpowered propeller of an aircraft (e.g. when the aircraft is on the ground and not operating) static. The propeller is prevented from rotating due to external forces (e.g. an air flow caused by wind, manual rotation of the propeller). When the propeller is powered, and the propeller is providing thrust, the propeller ground stop mechanism automatically disengages and does not provide any drag. Among various benefits, the propeller ground stop mechanism provides added safety to the ground support personnel.

20 Claims, 7 Drawing Sheets

PROPELLER GROUND STOP MECHANISM

RELATED APPLICATIONS

This application is a continuation of U.S. Non-Provisional patent application Ser. No. 18/504,869 filed Nov. 8, 2023, and entitled "Propeller Ground Stop Mechanism," which is a continuation of U.S. Non-Provisional patent application Ser. No. 17/480,102 filed Sep. 20, 2021, now U.S. Pat. No. 11,845,532 issued Dec. 19, 2023, and entitled "Propeller Ground Stop Mechanism," which claims benefit under 35 USC § 119 (e) to U.S. Provisional Patent Application No. 63/081,261 filed Sep. 21, 2020, and entitled "Propeller Ground Stop Mechanism," the disclosures of which are incorporated by reference herein in their entirety for all purposes.

BACKGROUND OF THE INVENTION

Aircraft propellers (e.g. lift fans, forward propellers, other rotors) may be used to provide lift and thrust to manned or unmanned multirotor aircraft, such as personal aircraft and drones. Mixed flight mode aircraft may use lift fans to provide lift in a vertical flight mode, e.g., to take off, hover, or land. Such an aircraft may transition after takeoff into a forward flight mode in which one or more forward flight propellers may be used to propel the aircraft through the air.

When the aircraft is on the ground and not operating, the propeller may spin under external environmental forces (e.g. due to crosswind). The propeller spinning while on the ground with no safe way to stop, constricts activity around the aircraft and poses a safety hazard for the ground crew who may be performing maintenance activity on the aircraft. While the propeller can be constrained using external devices such as pins, belts, etc. failure to remove these devices would result in damage to the propeller and potentially the aircraft, which may lead to catastrophic results.

SUMMARY

Described herein are examples (or embodiments) of a propeller ground stop mechanism configured to keep the propeller stationary and prevent the propeller from spinning while the aircraft is on the ground, and not operating (e.g. while the propeller is not powered). The propeller ground stop mechanism is activated when the propeller enters a slow-spin state or stop state after being powered down, e.g. when the rotational speed or rotations per minute (rpm) of the propeller (or the rotor coupled to the propeller) is below a predetermined threshold. Accordingly, embodiments stop the propeller from spinning when the aircraft is on the ground and the motor torque is zero, even when there is an environmental force (e.g. a crosswind). On the other hand, when the propeller is providing thrust, the propeller ground stop mechanism automatically disengages and does not provide any drag. When the motor powers the propeller to provide thrust, the propeller spin rate reaches or exceeds the predetermined threshold and the resulting centrifugal force causes the propeller ground stop mechanism to disengage so that the propeller ground stop mechanism is deactivated. Among various benefits, the propeller ground stop mechanism provides added safety to the ground support personnel.

Embodiments provide a propeller ground stop mechanism that includes a first element with a body portion and an arm portion extending from the body portion. The propeller ground stop mechanism further includes a second element coupled the first element via a coupling means, where the first element rotates about the coupling means with respect to the second element. The propeller ground stop mechanism also includes a preload element coupled to the first element and the second element. The preload element is configured to apply a first force in a first rotational direction about the coupling means to the first element. A net force on the first element is produced by at least the first force. The propeller ground stop mechanism further includes a brake pad coupled the arm portion of the first element. When the net force on the first element is in the first rotational direction, the brake pad engages a braking surface. When the net force on the first element is in a second rotational direction that is opposite the first rotational direction, the brake pad disengages from the braking surface.

Further embodiments provide a system comprising a motor housing including a rotor, a propeller coupled to the rotor, a braking surface provided around the rotor, and a propeller ground stop mechanism coupled to an exterior surface of the rotor.

These and other embodiments are described in further detail below.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention. Unless stated otherwise, a component may be implemented as a general component that is temporarily configured to perform the task at a given time or a specific component that is manufactured to perform the task.

Embodiments provide a propeller ground stop mechanism configured to keep an unpowered propeller of an aircraft (e.g. when the aircraft is on the ground and not operating) static. The propeller is prevented from rotating due to external forces (e.g. an air flow caused by winds, manual rotation of the propeller). When the propeller is powered, and the propeller is providing thrust, the propeller ground stop mechanism is automatically disengaged and does not provide any drag. Among various benefits, the propeller ground stop mechanism provides added safety to the ground support personnel. Due its passive state (e.g. the automatic engaging and disengaging), the propeller ground stop mechanism does not create added checklist processes as it does not need to be manually engaged and/or disengaged.

The issue of the spinning of an unpowered propeller (e.g. an unpowered lift fan) from airflow on the ground becomes an issue specifically for electric-motor aircrafts (e.g. air core electric motor). Internal combustion engine aircrafts may not suffer from a similar issue due to the natural braking provided from the valves and the inherent friction of the systems. In contrast, air core electric motors do not have iron therein, and the friction of such system is minimal (e.g. not enough to prevent the unpowered propeller from spinning). The propeller ground stop mechanism described herein is configured to keep the unpowered propeller of an electric-motor aircraft from spinning.

Figure 1A:
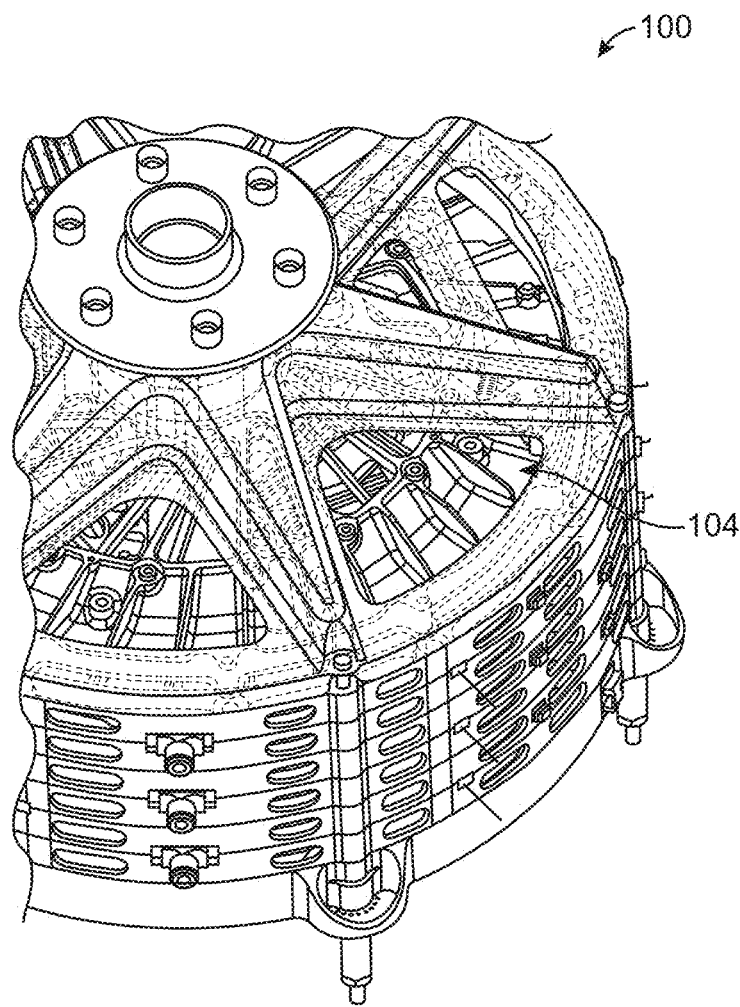
FIGS. 1A-1B illustrate an exemplary electric motor assembly including an exemplary propeller ground stop mechanism, according to various embodiments.
Figure 1B:
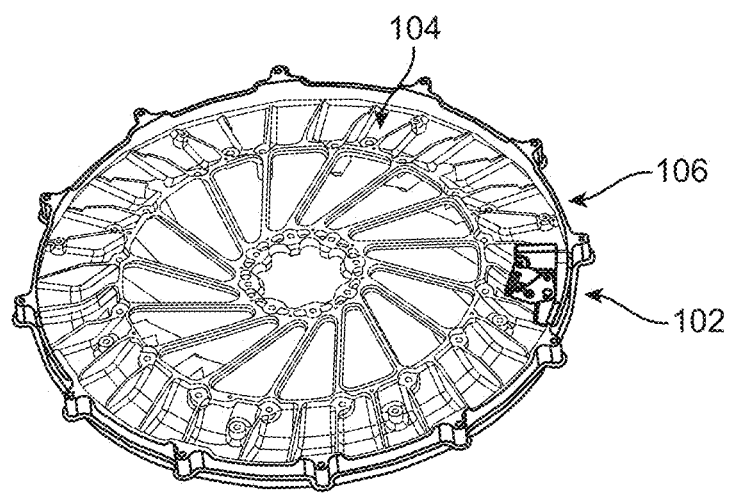

FIGS. 1A-1B illustrate an exemplary motor assembly 100 including an exemplary propeller ground stop mechanism 102, according to various embodiments. The electric motor assembly 100 may be provided within a housing, which may be coupled to a propeller 250 (shown in FIG. 2A). As shown in FIG. 1A, an electric motor assembly 100 can include a rotor 104 which may be coupled to the propeller to provide power to the propeller. In some embodiments, the electric motor assembly 100 may be part of an electric aircraft. According to various embodiments, the electric aircraft may be an electric vertical take-off/landing (VTOL) aircraft. In some embodiments, the electric VTOL aircraft may be an autonomous vehicle.

The rotor 104 is shown separately, apart from the electric motor assembly 100, in FIG. 1B. Also shown in FIG. 1B is a brake drum 106. The brake drum 106 may encircle the rotor 104. The rotor 104 may be configured to rotate about a central axis, while the brake drum 106 may be a stationary rim around the rotor 104, such that the rotor 104 rotates within the brake drum 106. In some embodiments, the brake drum 106 may be integrated as a part of the housing for the electric motor assembly 100. The brake drum 106 may include any suitable materials, such as aluminum, steel, and/or iron.

As shown in FIG. 1B, a propeller ground stop mechanism 102 may be coupled to the rotor 104. While one propeller ground stop mechanism 102 is shown, in some embodiments, additional propeller ground stop mechanisms 102 may be coupled to the rotor 104. For example, two propeller ground stop mechanisms 102 may be coupled to the rotor 104 at positions symmetrical to a central axis of the rotor 104. The propeller ground stop mechanism 102 may be configured to provide a decelerating (or braking) torque to the rotor 104 by applying braking pressure against the brake drum 106. The propeller ground stop mechanism 102 may positioned on the surface of the rotor 104 at or near the outer circumference of the rotor 104, such that the propeller ground stop mechanism 102 can extend beyond the rotor 104 to physically contact brake drum 106.

According to embodiments, the propeller ground stop mechanism 102 may be configured to apply braking pressure and braking torque that vary based on the spin rate of the rotor 104. For example, the propeller ground stop mechanism 102 may be a passive device that is disengaged from the brake drum 106 when the rotor 104 spin rate (and coupled propeller spin rate) is above a predetermined threshold spin rate, and that becomes engaged with the brake drum 106 when the rotor 104 spin rate slows to become below the predetermined threshold spin rate. The predetermined threshold spin rate can be a result of characteristics of the propeller ground stop mechanism 102, and can be configured to be lower than rotor 104 spin rates (and coupled propeller spin rates) that occur when the aircraft is in the flight mode. As a result, the propeller ground stop mechanism 102 does not engage or cause drag when the aircraft is in flight mode, but does engage and decelerate the propeller when aircraft is no longer in flight mode (e.g., powered down on the ground). According to various embodiments, the predetermined threshold spin rate may be any suitable value, such as about 1000 rpm, or about 600 rpm.

From a landed position, the aircraft may initiate a flight mode. When this happens, the electric motor assembly 100 is controlled to apply power to accelerate the rotor 104 and thereby the propeller coupled to the rotor 104. The rotor 104 eventually reaches a spin rate that is at or above the predetermined threshold, at which point the propeller ground stop mechanism 102 automatically stops providing braking torque to the rotor 104. For example, the propeller ground stop mechanism 102 withdraws from the brake drum 106 at or above the predetermined threshold spin rate.

According to some embodiments, there may be an operating range of spin rates for the rotor 104 (e.g., and propeller) during flight mode. For example, flight mode operating spin rates may vary, but may not go lower than 1000 rpm. According to embodiments, the propeller ground stop mechanism 102 is never active when the rotor 104 is spinning at a spin rate within the operating range (e.g., 1000 rpm and above).

Figure 2B:
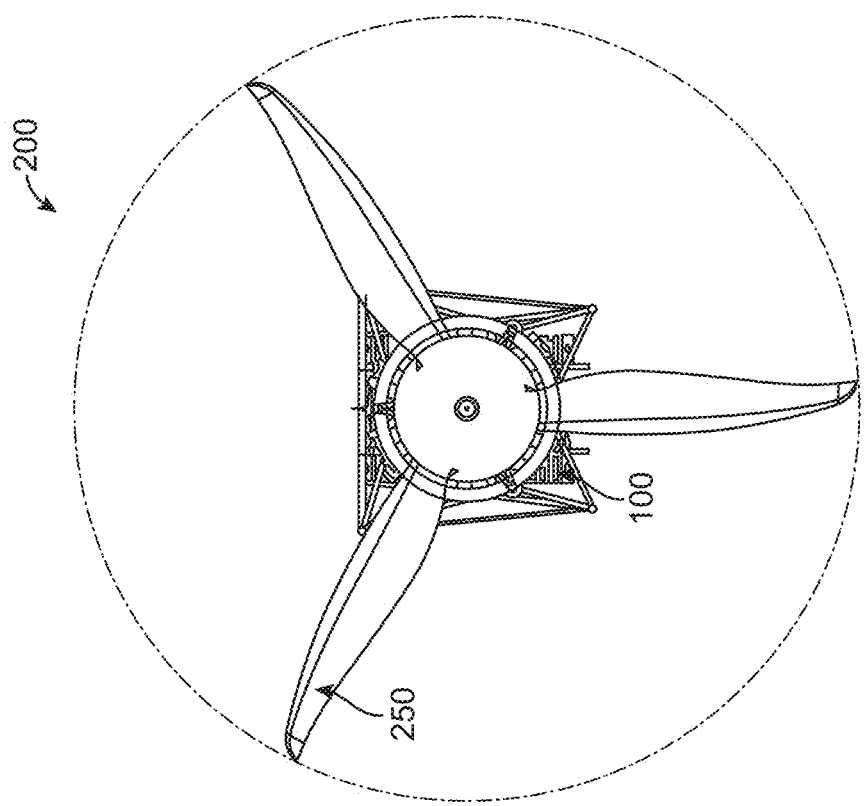
FIGS. 2A-2B illustrate an exemplary propeller assembly, according to various embodiments.
Figure 2A:
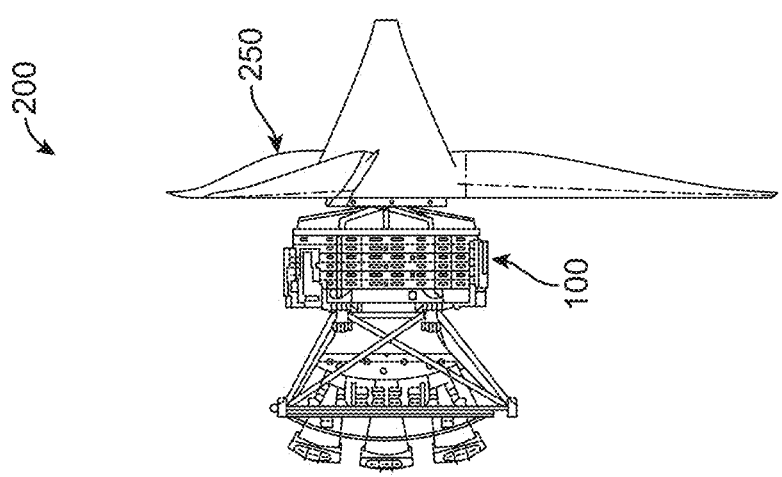

FIGS. 2A-2B illustrate an exemplary propeller assembly 200. FIG. 2A shows a side-view of the propeller assembly 200, which includes a propeller 250 coupled to the electric motor assembly 100. FIG. 2B shows a front-view of the propeller assembly 200 with the propeller 250 coupled to the electric motor assembly 100. As discussed above, the electric motor assembly 100 of the propeller assembly 200 can include the rotor 104, propeller ground stop mechanism 102, and the brake drum 106 as shown in FIG. 1B. According to some embodiments, the rotor 104 and propeller 250 may be coupled in such a manner that they spin together at the same spin rate.

The propeller ground stop mechanism 102 is configured to stop the propeller 250 and prevent the propeller 250 from passive spin due to unintended forces (e.g. winds from any direction) when the aircraft is stationary on the ground. The propeller ground stop mechanism 102 may be configured to resist winds of any suitable speed, such as about 20 knots or 25 knots. According to various embodiments, the propeller ground stop mechanism 102 may provide maximum torque when the propeller 250 is already stopped. Accordingly, a propeller ground stop mechanism 102 may configured to slow down and stop (e.g., from a spinning state) an unpowered propeller 150 in winds up to a first wind speed (e.g., about 20 knots), and that same propeller ground stop mechanism 102 may be able to keep a stationary propeller 150 stopped in stronger winds up to a higher second wind speed (e.g., up to 25 knots).

Figure 3A:
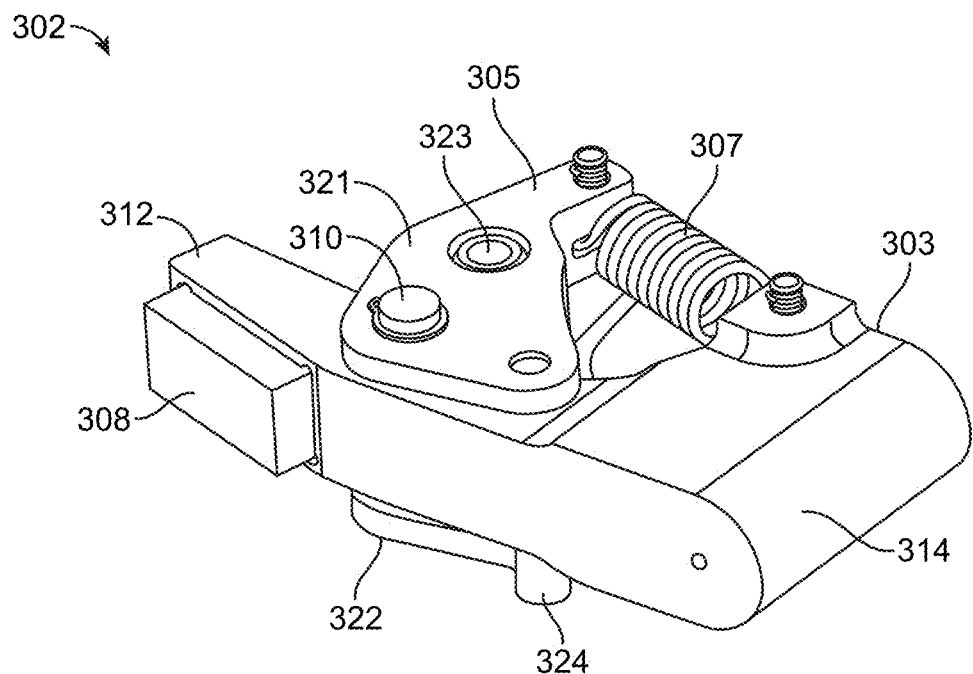
FIGS. 3A-3B illustrate an exemplary propeller ground stop mechanism, according to various embodiments.
Figure 3B:
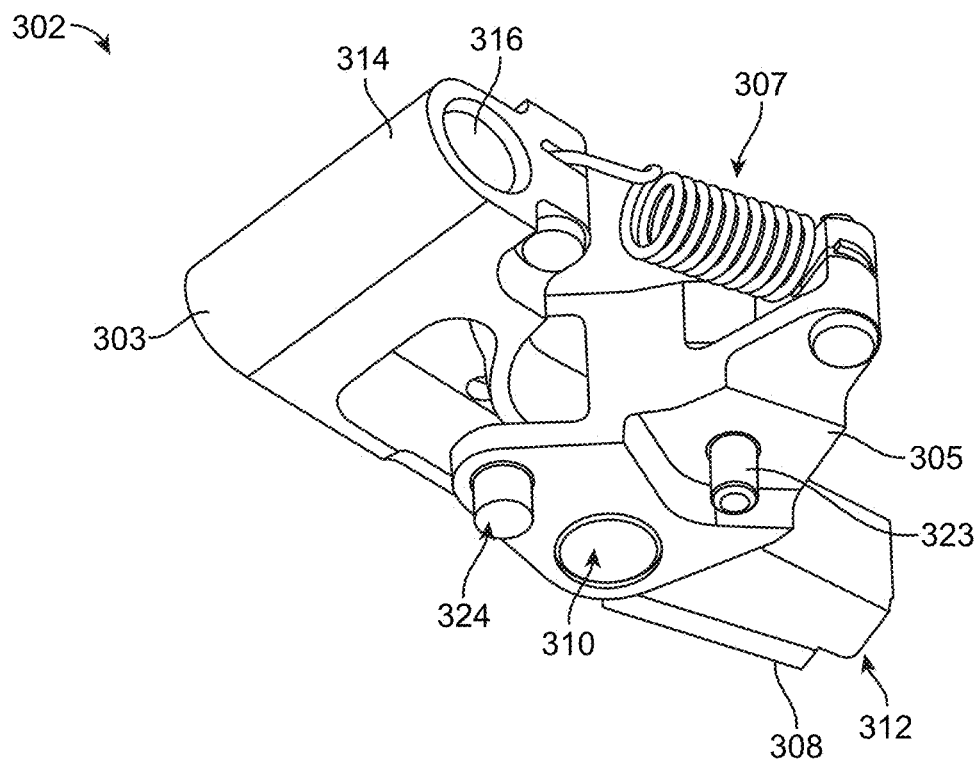

FIGS. 3A-3B illustrate an exemplary propeller ground stop mechanism 302, according to various embodiments. FIG. 3A shows an perspective top view of the propeller ground stop mechanism 302, and FIG. 3B shows perspective bottom view of the propeller ground stop mechanism 302.

The propeller ground stop mechanism 302 may include a brake pad 308. The brake pad 308 may be the part of the propeller ground stop mechanism 302 that physically contacts a brake drum (e.g., the brake drum 106). In some embodiments, the brake pad 308 may be a non-metallic material. Embodiments allow the brake pad 308 to include any suitable materials, such as organic materials (e.g., glass, fiber, rubber, carbon, Kevlar), ceramic materials, and/or semi-metallic materials (e.g., copper, iron, steel, brass, graphite).

The propeller ground stop mechanism 302 can be designed to apply the brake pad 308 to a stationary braking surface (e.g., the brake drum 106 in FIG. 1B), as described above. For example, the propeller ground stop mechanism 302 may be configured to apply the brake pad 308 to a braking surface when the rotor and/or propeller are stopped or spinning at low speeds (e.g., due to the electric motor being powered down), and to withdraw the brake pad 308 when the rotor and/or propeller are spinning faster (e.g., due to the electric motor providing power to rotate the rotor and/or propeller during flight operations).

In order to achieve this functionality, the brake pad 308 can be coupled to a first element 303. The first element 303 can be a support structure of any suitable material that is configured to move the brake pad 308 toward and away from a brake drum. The first element 303 is able to move in this manner due to rotatable coupling with a second element 305 (e.g., another support structure) that is attached to the rotor (e.g., the rotor 104 in FIG. 1B). Accordingly, the first element 303 and brake pad 308 can move relative to the rotor through the rotatable connection between the first element 303 and the second element 305.

The first element 303 and the second element 305 may be coupled through any suitable coupling means, such as a first pin 310. The first element 303 may rotate around the pin 310 relative to the second element 305. Accordingly, the pin 310 may provide a fulcrum and rotational axis for the first element 303.

The second element 305 may be coupled to the rotor (e.g., the rotor 104 in FIG. 1B) through any suitable coupling means, such as a second pin 323 that passes through the second element 304 and the rotor, and/or a stabilizing knob 324 that protrudes from the second element 305 into a corresponding notch of the rotor.

In addition to the pin 310, the first element 303 and second element 305 may also be coupled by a preload element 307. A first end and a second end of the preload element 307 may be coupled to the first element 303 and the second element 305, respectively, for example via a pair of rivets. The preload element 307 may be configured to provide rotational force to the first element 303 (e.g., and the brake pad 308) relative to the second element 305 (e.g., and the rotor) and about the fulcrum (e.g., the pin 310). The rotational force (or torque) may be provided in a first direction. The first direction can be defined as first rotational direction that is counter-clockwise when viewed from above (e.g., the view of FIG. 3A). From the perspective of the brake pad 308, the first direction is toward the brake drum and/or electric motor housing. Accordingly, the preload element 307 may be configured to provide a bias that moves the brake pad 308 toward the brake drum, and thereby apply braking pressure against the brake drum and braking torque to the rotor.

The preload element 307 may include a spring, a flexure element, or an air cylinder, according to some embodiments. In the example of a spring, the spring may be stretched beyond its equilibrium length due to being coupled to both the first element 303 and the second element 305. As a result, the spring may provide a tension force that pulls the first element 303 toward the second element 305 at the coupling point between the spring and the first element 303. Due to the direction and location of the tension force at the first element 303, the tension force provides a rotational force (or torque) about the fulcrum (e.g., the pin 310) in the first direction. The magnitude of the tension force is based on characteristics of the spring (e.g. the spring's stiffness) and the distance that the string is stretched beyond its equilibrium length. The magnitude of the rotational force is based on the tension force and the distance between the fulcrum and the coupling point (e.g., of the spring and the first element 303).

The rotational force applied by the preload element 307 may be referred to as a first force. Another rotational force, which may be referred to as a second force, may sometimes be applied to the first element 303 when the rotor is spinning. The second force is directed in a second direction that is opposite the first direction, such that the second force opposes the first force. The second direction can be defined as a second rotational direction that is clockwise when viewed from above (e.g., the view of FIG. 3A). From the perspective of the brake pad 308, the second direction is away from the brake drum and/or electric motor housing.

In order describe the second force, the structures of the first element 303 and the second element 305 will first be discussed in more detail. According to various embodiments, the first element 303 may include a body portion 314 and an arm portion 312 that extends away from the body portion 314. The second element 305 may include a top portion 321 and a bottom portion 322 that are at least partially separated by a gap there between. The arm portion 312 of the first element 303 may extend through the gap between the top portion 321 and the bottom portion 322 of the second element 305. The coupling (e.g., the pin 310) between the first element 303 and the second element 305 mentioned above may be located here, extending through the top portion 321 of the second element 305, the bottom portion 322 of the second element 305, and the arm portion 312 of the first element 303. As a result, the pin 310 may provide a point of rotation (e.g., fulcrum) about which the first element 303 can rotate relative to the second element 305 (e.g., and the rotor to which the second element 305 is attached).

As shown in FIGS. 3A-3B, the brake pad 308 may be coupled to an outer surface of the arm portion 312 of the first element 303 on the opposite side of the pin 310 relative to the body portion 314. Further, the body portion 314 of the first element 303 may include a weight element 316. The weight element 316 may take the form of a cylinder block, as shown, or any other suitable shape. The weight element 316 can include tungsten or any other suitable material.

Due to the geometry of the first element 303, the location of the pin 310, and/or the presence of the weight element 316, the first element's total weight may not be symmetrically distributed about the fulcrum. As a result, the first element's center of mass may not be located at the fulcrum (e.g., the pin 310). Instead, the center of mass may be within the body portion 314 or on the body portion's side of the rotational fulcrum. As a result, when the rotor spins and centrifugal force is applied to the entire first element 303, a non-symmetrical rotational bias creates a net rotational force (or torque) at the first element 303. The weight element 316 and body portion's side of the fulcrum provide a rotational force (caused by the centrifugal force) that is greater than an opposing rotational force (cause by the centrifugal force) on the brake pad's side of the fulcrum. The net rotational force is the second force in the second direction, as mentioned above. Centrifugal forces increase as rotational speeds increase. Accordingly, the second force increases as the rotor spin rate increases.

According to embodiments, the second force (e.g., as caused by centrifugal force at the weight element 316) opposes the first force (e.g., as provided by the preload element 307). When the rotor is stopped and not spinning, the second force is not present. The first force is unimpeded, and causes physical contact and pressure between the brake pad 308 and the brake drum. The resulting friction provides a braking torque that prevents the rotor from spinning due to external forces (e.g., wind) on the propeller and rotor. However, when the electric motor is operated to provide power, it can provide sufficient torque (e.g., more than the torque caused by external winds) to overcome the braking torque. As a result, the rotor will begin to spin, even if the braking torque is still present. As the rotor begins to spin, the second force will start to be applied to the first element 303. As the rotor spin rate increases, the second force will also increase and will gradually subtract the effect of the first force (and thereby reduce the braking torque on the rotor). Eventually, at a certain predefined threshold spin rate (e.g., 600 rpm), the second force becomes equal to or greater than the first force. At this point, the first element 303 experiences a net force in the second direction, causing the first element 303 to rotate in the second direction. When this happens, the brake pad disengages and moves away from the brake drum, eliminating the braking torque entirely. Accordingly, the second force is used to automatically disengage the braking torque on the rotor at a time when the electric motor is causing the rotor and propeller to spin at and above the threshold spin rate (e.g., for providing flight thrust), such that the propeller ground stop mechanism 302 generates zero additional friction at the rotor/propeller at and above threshold spin rate.

Additional details related to the interplay of rotational forces and the functioning of the propeller ground stop mechanism 302 are discussed further below with respect to FIG. 4.

The exemplary propeller ground stop mechanism 302 illustrated in FIGS. 3A-3B may be a passive mechanism that is automatically engaged below the threshold spin rate (also referred to as rotational speed) of the rotor (and propeller), and that is automatically disengaged and remains disengaged at and above the threshold spin rate. According to embodiments, no extra controls are needed. Instead, the propeller ground stop mechanism 302 automatically applies braking torque when propeller is not being powered, as it will naturally slow down to below the threshold spin rate due to wind resistance. Similarly, when the propeller is powered and accelerated, the propeller ground stop mechanism 302 automatically withdraws braking torque when the threshold spin rate is reached.

Figure 4:
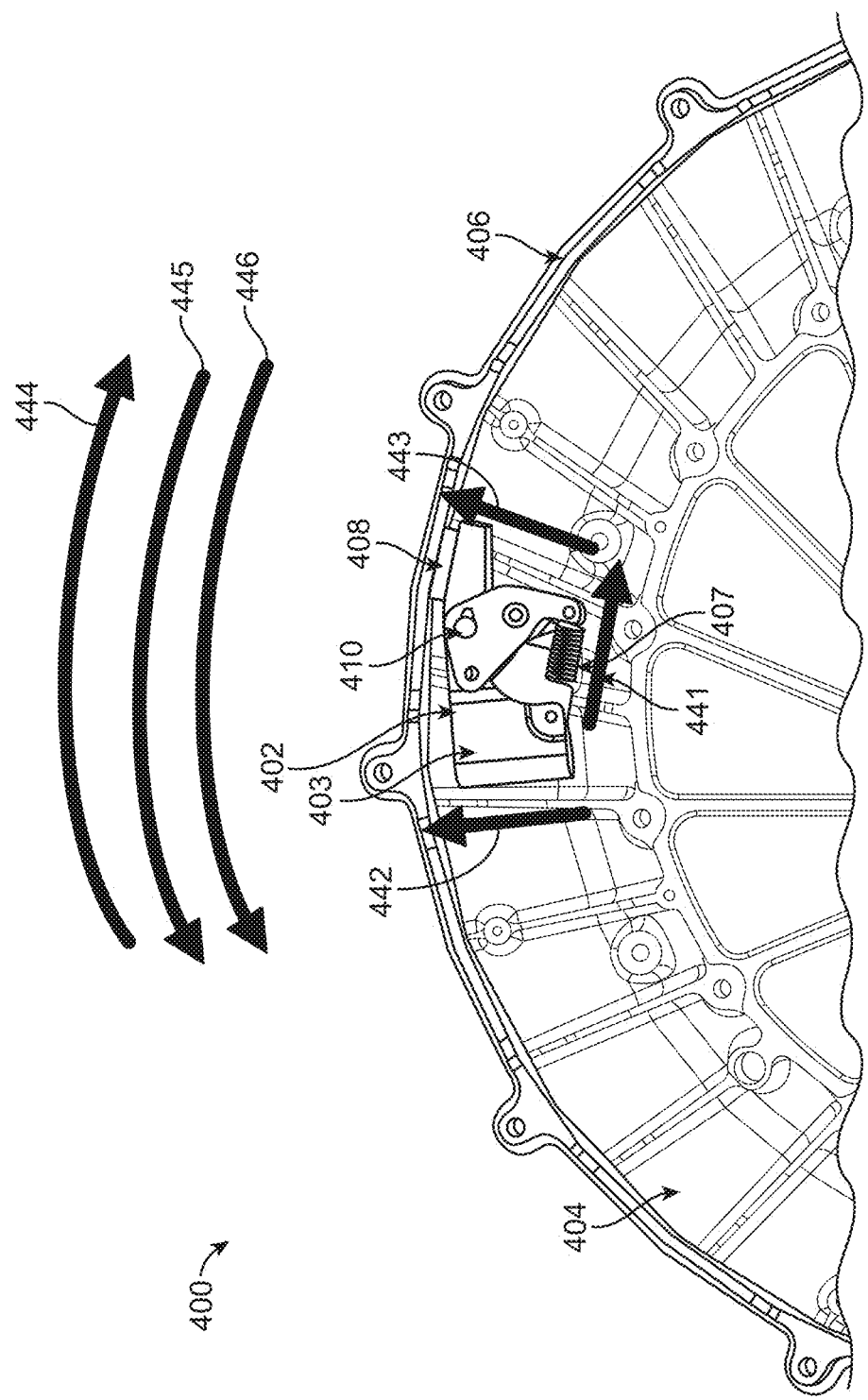
FIG. 4 illustrates an exemplary system including a propeller ground stop mechanism coupled to a rotor, according to various embodiments.

FIG. 4 illustrates an exemplary system 400 including a propeller ground stop mechanism 402 coupled to a rotor 404 with a brake drum 406 provided around the rotor 404, according to various embodiments. The propeller ground stop mechanism 402 is coupled to an exterior surface of the rotor 404, at or near an outer edge of the rotor 404. As described above with respect to FIGS. 3A-3B, propeller ground stop mechanism 402 can be coupled to the rotor 404 through a pin and/or stabilizing knob at a second element of the propeller ground stop mechanism 402.

FIG. 4 includes arrows representing some of the various forces and directions of movement involved in the system 400. For example, a first force 441 represents a rotational force applied by the preload element 407 to the first element 403 in a first direction about the fulcrum 410 (e.g., counter-clockwise). When the rotor 404 (and propeller) is not spinning or is spinning slowly, the first force 441 may create a brake pressure 443 between the brake pad 408 and the brake drum 406. The brake pressure 443 can in turn enable a braking torque 444 that resists a wind torque 445 whenever the wind torque 445 occurs. For example, a passive external force (e.g., wind) may act on the propeller and cause a wind torque 445 (which may be referred to as a third force) in a third direction on the rotor 404, where the third direction (also referred to as a third rotational direction) is a counter-clockwise rotational direction about an axis of the rotor 404. When this occurs, an equal and opposite braking torque 444 (which may be referred to as a fourth force) may be induced that resists and cancels out the wind torque 445, thereby keeping the rotor 404 (and propeller) static. If the wind force is in the third direction, the braking torque 444 may be provided to the rotor 404 in a fourth direction, where the fourth direction (also referred to as a fourth rotational direction) is a clockwise rotational direction about the axis of the rotor 404. The braking torque 444 may vary based on the wind torque 445 (e.g., zero brake torque 444 may manifest when there is no wind torque 445). The brake torque 444 may have a maximum possible magnitude that is based on, for example, the brake pressure 443. Further, the braking torque 444 may change directions, depending on the direction of the wind torque 445.

According to some embodiments, the rotational axis (or fulcrum 410) of the propeller ground stop mechanism 402 may be parallel to the rotational axis of the rotor 404. As a result, the first direction (e.g., counter-clockwise rotation about the axis of the propeller ground stop mechanism 402) may be parallel to the third direction (e.g., counter-clockwise rotation about the axis of the rotor 404). Similarly, the second direction (e.g., clockwise rotation about the axis of the propeller ground stop mechanism 402) may be parallel to the fourth direction (e.g., clockwise rotation about the axis of the rotor 404).

A second force 442 represents a net rotational force on the first element 403 of the propeller ground stop mechanism 402 as produced by centrifugal forces applied to the first element 403. The second force 442 is in a second direction about the fulcrum 410 (e.g., clockwise). The second force 442 is not present when the rotor 404 is not spinning. However, once the rotor 404 is spinning (e.g., due to power provided by the electric motor), the second force 442 increases. As the second force 442 increases, it cancels some of the effect of the first force 441. This in turn reduces the braking pressure 443, and reduces the maximum possible braking torque 444. Eventually, at a threshold spin rate, the second force 442 becomes larger than the first force 441. This causes the first element 403 to rotate about the fulcrum 410 (e.g., in the second direction) so that the brake pad 408 is removed from the brake drum 406. The braking pressure 443 and braking torque 444 are thereby eliminated (e.g., even as the first force 441 remains).

As an example, an electric motor torque 446 (which may be referred to as a fifth force) can cause the rotor 404 to spin in the third direction (e.g., counter-clockwise about the axis of the rotor 404). As shown, in some instances, the electric motor torque 446 and the wind torque 445 may both have the same direction (e.g., the third direction). Similar to the wind torque 445, the electric motor torque 446 may induce an opposing braking torque 444. The wind torque 445 is not strong enough to overcome the braking torque 444 (e.g., for a wind of 20 knots). However, the electric motor torque 446 can overpower the braking torque 444. Accordingly, the rotor 404 and propeller can begin to spin in the third direction. The brake pad 408 may maintain contact and friction at the brake drum 406 during the initial spinning acceleration. Thus, the brake pad 408 may travel in the third direction with the rotor 404, sliding with friction along the brake drum 406 and continuing to cause some amount of opposing braking torque 444 (which is now drag on the electric motor). However, as the spin rate increases due to the electric motor torque 446, the brake pressure 443 and braking torque 444 decrease. Eventually, at a certain threshold spin rate, the brake pressure 443 is eliminated and the brake pad 408 no longer contacts the brake drum 406. At this point, the braking torque 444 disappears and the propeller ground stop mechanism 402 does not cause any drag, as is desired when the propeller is being used to provide thrust (e.g., during flight operations). According to various embodiments, the rotor 404 (and propeller) may reach the threshold spin rate from a stopped position (e.g. from about 0 rpm) in about 0.5 to 5 seconds.

The propeller ground stop mechanism 402 may be designed to provide any suitable amount of braking torque 444 for resisting any suitable amount of wind torque 445. For example, the propeller ground stop mechanism 402 may be configured to resist wind torque 445 from winds up to 15 knots, 20 knots, 25 knots, 30 knots, or any other suitable wind speed. The strength of the braking torque 444 can be increased by, for example, increasing the strength of the first force 441, which can be increased by including a stronger preload element 407 (e.g., a stiffer spring or a spring that is extended further beyond its equilibrium length). According to some embodiments, if the propeller ground stop mechanism 402 is configured to resist a greater magnitude of wind torque 445, then the electric motor may need to generate a greater amount of electric motor torque 446 to overpower the braking torque 444 when propeller operation is desired. Accordingly, embodiments may include a propeller ground stop mechanism 402 that provides enough resistance to a suitable range of passive external forces (e.g., winds up to 25 knots) without creating an undue burden on the electric motor for initiating propeller spin.

As mentioned above, the propeller ground stop mechanism 402 may continue to cause drag when the propeller is beginning to spin. The predetermined threshold spin rate at which the propeller ground stop mechanism 402 disengages is based on at least the weight of the weight element (e.g., the weight element 316 in FIG. 3B). When the weight element is heavier, the second force increases faster and the propeller ground stop mechanism 402 disengages at a lower spin rate, thereby reducing the amount of drag time. However, it is desirable to minimize weight on an aircraft. Accordingly, embodiments may include a weight element that has a minimum amount of weight that is simultaneously sufficient to disengage the propeller ground stop mechanism 402 at a suitably low spin rate.

As mentioned above, when the second force overpowers the first force, the first element 403 of the propeller ground stop mechanism 402 rotates about the fulcrum 410 (e.g., in the second direction) so that the brake pad 408 is removed from the brake drum 406. This also means that the body of the first element 403 (e.g., opposite the fulcrum 410 from the brake pad 408) moves toward the brake drum 406. It is desirable to prevent the body of the first element 403 from contacting the brake drum 406. Accordingly, embodiments can include limitations on the range of motion for the first element 403 of the propeller ground stop mechanism 402. For example, the propeller ground stop mechanism 402 may include one or more physical blocking mechanisms (e.g., an extending tab and/or another mechanical stop) that block the first element 403 from moving too far in the second direction. As another example, the preload element 407 may restrict the movement of the first element 403. If the preload element 407 is a spring, the first force will increase as the first element 403 rotates (e.g., due to the spring being further extended passed equilibrium), and this increased first force may become equal the second force in magnitude, such that the first element 403 does not continue to rotate further in the second direction.

Figure 5:
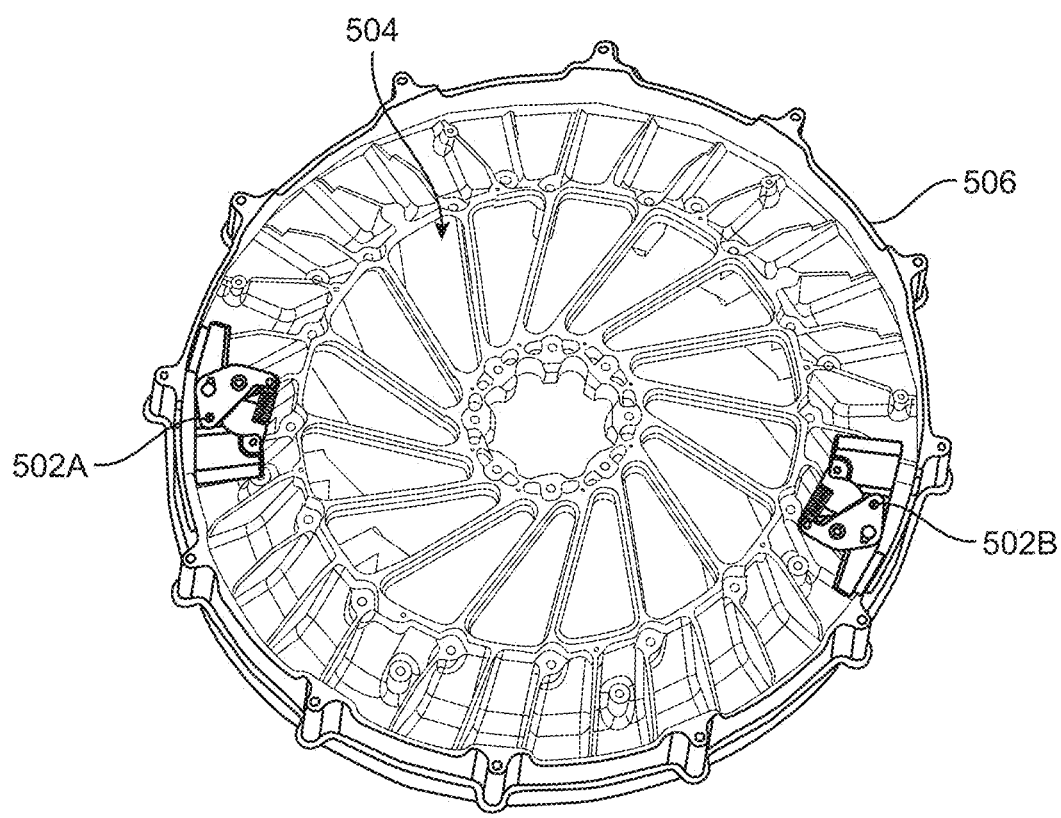
FIG. 5 illustrates an exemplary system including a plurality of propeller ground stop mechanisms coupled to a rotor, according to various embodiments.

FIG. 5 illustrates a plurality of propeller ground stop mechanisms coupled to an exemplary rotor, according to various embodiments. As shown in FIG. 5, one or more propeller ground stop mechanisms 502A, 502B may be coupled to the rotor 504. For example, a pair of propeller ground stop mechanisms 502A, 502B may be coupled with 180 degree spacing to the rotor 504. An advantage of symmetrically placing a plurality of propeller ground stop mechanisms (such as the two propeller ground stop mechanisms 502A, 502B shown in FIG. 5) is that when the propeller ground stop mechanisms move from an engaged position to a disengaged (or retracted from the brake drum 506) position, their movement does not affect the balance on the rotor 504. A similar effect can be provided by symmetrically spaced propeller ground stop mechanisms of any suitable number, such as 3, 4, or 5 propeller ground stop mechanisms equally spaced around the rotor 504.

Another advantage of having a plurality of propeller ground stop mechanisms is the gain in space. For example, when a plurality of propeller ground stop mechanisms are coupled to the rotor, it is possible to reduce the size of each propeller ground stop mechanism as long as the collective impact of the plurality of the propeller ground stop mechanisms can keep the propeller static when subject to a desired range of external wind forces. Any suitable number of propeller ground stop mechanisms may be used in connection with embodiments described herein.

Figure 6A:
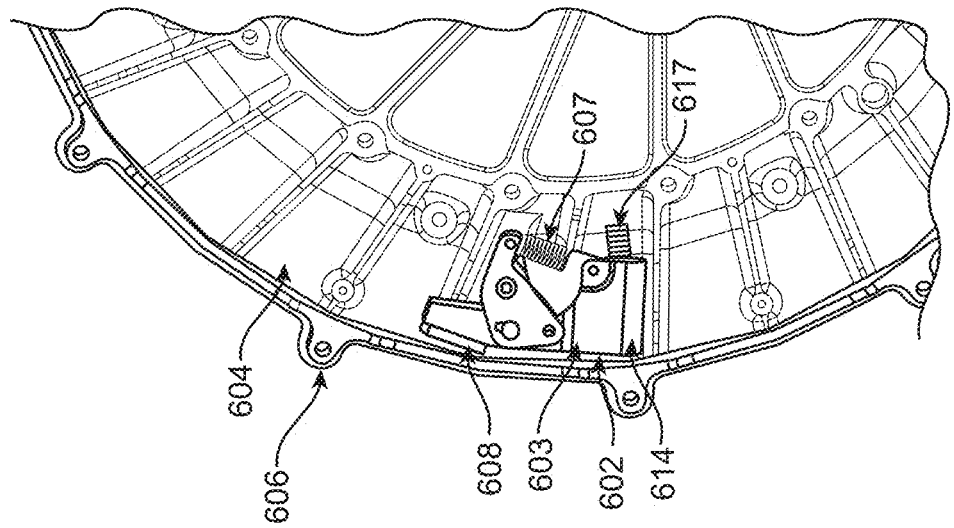
FIGS. 6A-6B illustrate different position states of a propeller ground stop mechanism, according to various embodiments.

FIG. 6A illustrates an exemplary propeller ground stop mechanism 602 in an engaged configuration, which may also be referred to as a first position, according to embodiments. In the first position, the preload element 607 applies a first rotational force to the first element 603. The rotor 604 may be stopped or otherwise spinning at a spin rate below a predetermined threshold. Accordingly, the second rotational force is zero or otherwise less than the first rotational force. As a result, a net force in the first rotational direction is applied to the first element 603, causing the first element 603 to be in the first position. In the first position, the brake pad 608 is in contact with the brake drum 606. Also, the body 614 of the first element 603 is positioned relatively closer to the center of the rotor 604. This is shown by the track 617, which includes indicators for the position of the body 614.

Figure 6B:
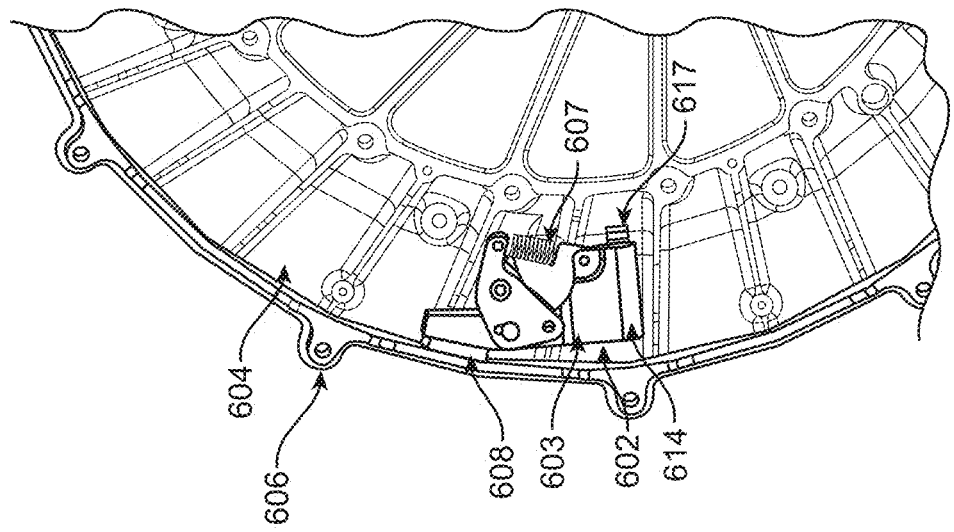

FIG. 6B illustrates the exemplary propeller ground stop mechanism 602 in a disengaged configuration, which may also be referred to as a second position, according to embodiments. In the second position, the preload element 607 still applies a first rotational force to the first element 603. However, the rotor 604 is now spinning at a spin rate above a predetermined threshold. Accordingly, the second rotational force is greater than the first rotational force. As a result, a net force in the second rotational direction is applied to the first element 603, causing the first element 603 to be in the second position. In the second position, the brake pad 608 is withdrawn from the brake drum 606. Also, the body 614 of the first element 603 is positioned relatively further from the center of the rotor 604. This is shown by the track 617, which includes indicators for the position of the body 614. More indicators of the track 617 are revealed in FIG. 6B, thereby demonstrating the displacement of the first element 603 from the first position to the second position.

As mentioned above, in some embodiments, the rotational axis of the first element may be parallel to the spin axis of the rotor. Alternatively, in other embodiments, the rotational axis of the first element may be orthogonal to the spin axis of the rotor. For example, instead of a drum-style brake being coupled to the rotor, a disk-style brake may be coupled to the rotor. One or more propeller ground stop mechanisms may be configured to interact with an interior surface of the disk brake. The propeller ground stop mechanisms may function as described herein, and may extend away from the rotor toward the disk brake such that the brake pad makes physical contact with an interior surface of the disk brake when in an engaged position.

Figure 7A:
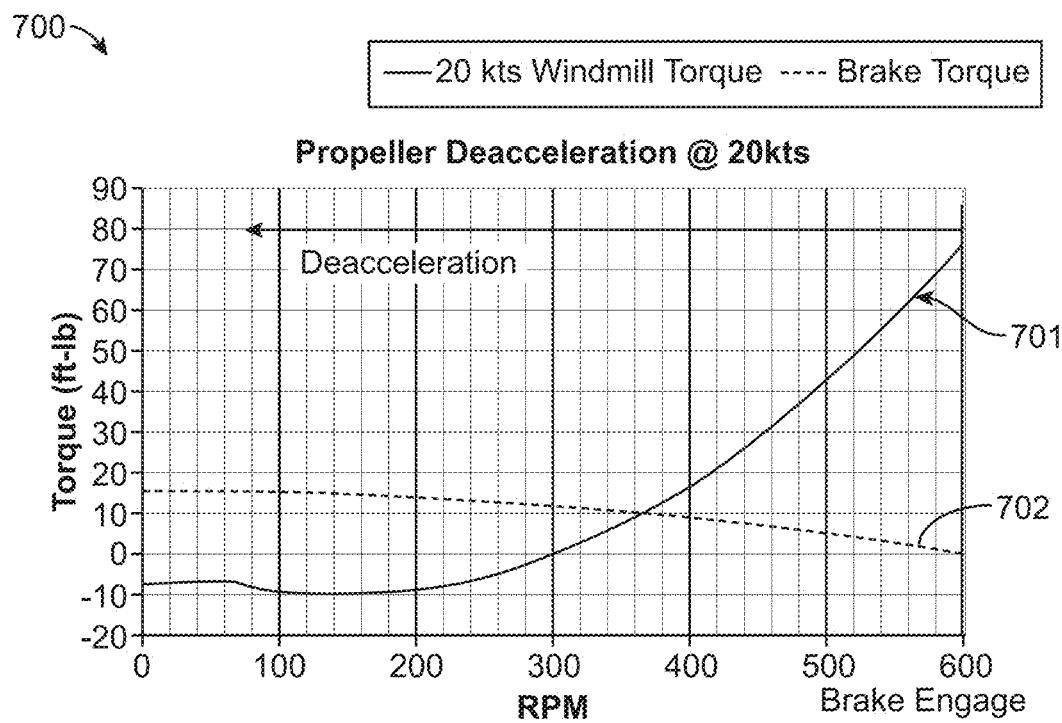
FIG. 7A illustrates a comparison of a propeller ground stop mechanism braking torque to an example wind torque, according to various embodiments.

FIG. 7A illustrates a comparison of a propeller ground stop mechanism braking torque to an example wind torque, according to various embodiments described herein. As illustrated in graph 700, the X-axis represents a rotor/propeller spin rate (in rpm), and the Y-axis represents an amount of torque applied to the rotor/propeller.

Curve 701 represents an example external force, such as a wind force. In this example, the curve 701 shows how a wind of 20 knots causes a torque on the rotor/propeller, and how the torque changes when the propeller spin rate changes. For example, curve 701 shows that if a propeller is not spinning (e.g., rpm of 0), the wind applies a wind torque (e.g., −8 lb-ft). In this example, a negative torque can represent a torque on the rotor in the third rotational direction (e.g., a counter-clockwise rotational direction about an axis of the rotor), and a positive torque can represent a torque on the rotor in the fourth rotational direction (e.g., a clockwise rotational direction about an axis of the rotor).

In the absence of other forces (e.g., if there were no braking forces), the wind torque will cause the rotor/propeller to spin. The curve 701 shows that, as the rotor/propeller begins to spin, the wind torque will decrease in magnitude. Also, the curve 701 shows that at a spin rate of 300 rpm, the wind torque reduces to zero. If the rotor/propeller somehow increases to a higher spin rate than 300 rpm (e.g., due to a gust of wind), the curve 701 rises above the X-axis, meaning that the wind torque switches from the third direction (e.g., counter-clockwise) to the fourth direction (e.g., clockwise). This means that the standard 20 knots wind torque is now slowing down the propeller's spin rate (e.g., because the propeller is spinning in the third direction), and that the propeller is spinning faster than the 20 knots wind supports. Thus, below 300 rpm, the wind torque accelerates the propeller spin, and above 300 rpm, the wind torque becomes air resistance that decelerates the propeller spin. In other words, this amount of wind (e.g., 20 knots) may naturally cause the propeller to spin at 300 rpm (e.g., in absence of braking forces).

Curve 702 represents a propeller ground stop mechanism braking torque that opposes propeller spin. As shown by curve 702, the braking torque varies based on the propeller spin rate. The braking torque is greatest (or at least has the greatest maximum potential to resist external forces) when the propeller is not spinning. For example, at an rpm of 0, there is a maximum braking torque of 17 lb-ft. The braking torque gradually decreases with propeller spin rate (e.g., due to centrifugal forces on the first element counteracting the brake pressure, as discussed above). At 600 rpm, the braking torque diminishes to zero. Accordingly, in this example, the threshold spin rate for disengaging the propeller ground stop mechanism is 600 rpm.

The graph 700 demonstrates that, for a wind of 20 knots, the combination of the wind torque 701 and braking torque 702 will always produce a net torque that slows the propeller down to a stop, or keeps the propeller stopped from spinning (e.g., in the absence of additional forces such as electric motor input). For example, when the propeller is stopped (e.g., spin rate of 0 rpm), the wind torque is 8 lb-ft in the third rotational direction, and the braking torque is capable of up to 17 lb-ft in the fourth rotational direction. Accordingly, the braking torque is able to resist the wind torque, and the propeller remains in the stopped position (e.g., 0 rpm spin rate). In other examples, a stronger wind may be able to overpower the braking torque (e.g., a wind of 80 knots). However, it may be desirable to configure the braking torque to resist only up to a certain amount of wind (e.g., 25 knots), so that the braking torque does not cause an unnecessary amount of drag on the electric motor when the propeller is initially being accelerated.

Even though the wind torque (e.g., for a wind of 20 knots) will not be able accelerate the propeller from a stopped position (e.g., due to the stronger braking torque), the propeller may already have some spinning inertia (e.g., if the propeller was recently powered down). In this case, the graph 500 shows that the propeller spin will be decelerated until 0 rpm. For example, above 600 rpm, the propeller ground stop mechanism is disengaged and not providing any braking torque. However, the propeller is spinning faster than the wind torque can support, so the wind essentially becomes air resistance that slows down the propeller. This phase continues until the propeller spin rate drops to below 600 rpm. At this point, the braking torque is activated, and both the braking torque and wind torque (e.g., air resistance) work together to slow down the propeller. When the propeller spin rate drops to below 300 rpm, the wind torque switches directions and tries to accelerate the propeller. However, the braking torque is stronger than the wind torque all the way down to 0 rpm, where the propeller arrives at a stable rest condition.

As discussed above, in embodiments, the only way for the propeller to experience an increase in spin rate is through an additional input torque from the electric motor. The electric motor torque can overpower the braking torque at 0 rpm, and can continue overpowering the braking torque at each spin rate until the braking torque disappears at 600 rpm. At that point the electric motor can power the propeller without being impeded by the braking torque (e.g., even if it still may be working against drag caused by the air resistance torque 701).

Figure 7B:
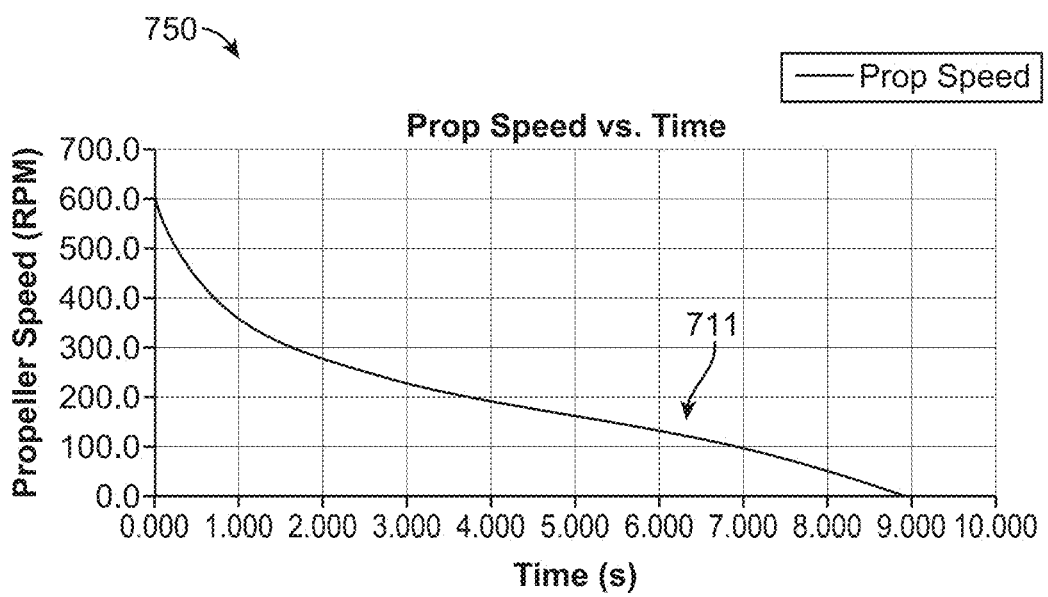
FIG. 7B illustrates an example of propeller deceleration due to braking and/or air resistance effects, according to various embodiments described.

FIG. 7B illustrates an example of propeller deceleration due to braking and/or air resistance effects. As illustrated in graph 750, the X-axis represents an amount of time (in seconds), and the Y-axis represents a rotor/propeller spin rate (in rpm). Curve 711 represents how the propeller spin rate decreases over time. For example, the electric motor may stop providing power to the rotor and propeller at or before time 0. Accordingly, at time 0, the propeller may still have some inertia and be spinning at 600 rpm, but a combination of braking torque and air resistance torque are acting on the propeller to reduce the spin rate. The braking torque and air resistance torque may have the magnitude values discussed above and shown in FIG. 7A.

As shown, the propeller spin rate continuously decreases over time, and may come to a stop (e.g., from 600 rpm) in slightly less than 9 seconds. Also, curve 711 demonstrates a faster deceleration between the spin rates of 600 rpm and 300 rpm. This may be due to both the braking torque and air resistance torque acting together to slow the propeller within this range of spin rates (e.g., as discussed above with respect to FIG. 7A). After 300 rpm, the air resistance torque may become the wind torque that tries to accelerate the propeller (e.g., for a wind of 20 knots). The brake torque is stronger than the opposing wind torque, but now the total decelerating force is weaker. However, the brake torque continues growing stronger as the spin rate decreases, until the propeller finally comes to a stop.

In some embodiments, the propeller ground stop mechanism may be used in electric aircrafts, such as autonomous electric aircrafts. An aircraft may include a plurality of propellers and/or lift fans. One or more propeller ground stop mechanisms may be provided in the form of a passive mechanism as a safety feature. Embodiments allow all of any suitable number of an aircraft's propellers and/or lift fans to include one or more propeller ground stop mechanisms. For example, in some embodiments, certain subset of propellers may closer to or otherwise considered more hazardous to passengers and/or maintenance crew, and therefore may be equipped with one or more propeller ground stop mechanisms. Other propellers may be further away from areas trafficked by people, and therefore may not be equipped with propeller ground stop mechanisms.

According to various embodiments, the propeller ground stop mechanism may engage when a non-powered propeller spins at a predetermined spin rate (e.g. about 600 rpm or less). The propeller ground stop mechanism may be capable of stopping a propeller caused to spin due to the crosswind of about 20 knots within about 9 seconds. The propeller ground stop mechanism can also keep the propeller stopped during crosswinds, and can assist with bring a propeller to a stop after the propeller is powered-down.

As weight is of essence for aircraft systems, the propeller ground stop mechanism may be designed not to add considerable weight to the aircraft. According to various embodiments, the propeller ground stop mechanism may have a weight of about 1.2 lbs. Due to potential wear and tear, it may be desirable to replace the propeller ground stop mechanism after about 100 flights, assuming 2 engagements per flight. In some embodiments, instead of replacing an entire propeller ground stop mechanism, certain parts may be replaced, such as brake pads, preload elements, and/or brake drums.

While the invention has been described with reference to specific embodiments, those skilled in the art with access to this disclosure will appreciate that variations and modifications are possible.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A propeller ground stop mechanism including:
   a first element including a body portion and an arm portion extending from the body portion;
   a second element coupled to the first element via a coupling means, wherein the coupling means provides a fulcrum such that the first element is configured to rotate about the fulcrum with respect to the second element;
   a preload element coupled to the first element and the second element, wherein the preload element is configured to apply a first force in a first direction to the first element, wherein a net force on the first element is produced by at least the first force; and
   a brake pad coupled to the arm portion of the first element, wherein when the net force on the first element is in the first direction, the brake pad engages a braking surface, and when the net force on the first element is in a second direction that is opposite the first direction, the brake pad disengages from the braking surface.

2. The propeller ground stop mechanism of claim 1, wherein the first direction at the brake pad is toward the braking surface, such that the preload element is configured to apply the first force at the brake pad toward the braking surface.

3. The propeller ground stop mechanism of claim 1, wherein the preload element is configured to bias the brake pad toward the braking surface.

4. The propeller ground stop mechanism of claim 1, wherein when the first force provided by the preload element is overcome by a second force in the second direction, the brake pad disengages from the braking surface.

5. The propeller ground stop mechanism of claim 4, wherein the second force in the second direction is applied to the first element when the propeller ground stop mechanism is rotating.

6. The propeller ground stop mechanism of claim 4, wherein the second force includes a centrifugal force.

7. The propeller ground stop mechanism of claim 1, wherein the brake pad disengages the braking surface when a spin rate of the propeller ground stop mechanism is greater than a predetermined spin rate.

8. The propeller ground stop mechanism of claim 1, wherein the brake pad engages the braking surface when the propeller ground stop mechanism is at rest due to the preload element providing the first force to the brake pad toward the braking surface and absence of a second force in the second direction when the propeller ground stop mechanism is at rest.

9. The propeller ground stop mechanism of claim 1, wherein the preload element provides a tension force on the first element toward the second element at a coupling point between the preload element and the first element, the tension force causes a rotational force about the fulcrum, and the first force is the rotational force, such that the tension force biases the brake pad toward the braking surface.

10. The propeller ground stop mechanism of claim 9, wherein the brake pad and the body portion are on opposite sides of the fulcrum, and the coupling point between the preload element and the first element is on the body portion, such that the tension force at the coupling point is configured to cause braking pressure on the braking surface through the brake pad.

11. The propeller ground stop mechanism of claim 1, wherein the preload element is a spring.

12. The propeller ground stop mechanism of claim 1, wherein the fulcrum is positioned on the arm portion.

13. The propeller ground stop mechanism of claim 1, wherein the coupling means is a pin, and wherein the pin extends through the arm portion.

14. The propeller ground stop mechanism of claim 1, wherein the first direction is a first rotational direction about the fulcrum, wherein the second direction is a second rotational direction about the fulcrum.

15. The propeller ground stop mechanism of claim 1, wherein the preload element is configured to continuously apply the first force on the brake pad toward the braking surface.

16. The propeller ground stop mechanism of claim 1, wherein the brake pad engages the braking surface as a default state when the propeller ground stop mechanism is at rest.

17. The propeller ground stop mechanism of claim 1, wherein the net force on the first element is further produced by a second force, the second force increases with a spin rate of the propeller ground stop mechanism, the second force becomes greater than the first force when the spin rate of the propeller ground stop mechanism becomes greater than a predetermined spin rate, the net force on the first element is in the first direction when the first force is greater than the second force, and the net force on the first element is in the second direction when the second force is greater than the first force.

18. A system comprising:
a propeller ground stop mechanism including:
a first element including a body portion and an arm portion extending from the body portion;
a second element coupled to the first element via a coupling means, wherein the coupling means provides a fulcrum such that the first element is configured to rotate about the fulcrum with respect to the second element;
a preload element coupled to the first element and the second element, wherein the preload element is configured to apply a first force in a first direction to the first element, wherein a net force on the first element is produced by at least the first force; and
a brake pad coupled to the arm portion of the first element, wherein when the net force on the first element is in the first direction, the brake pad engages a braking surface, and when the net force on the first element is in a second direction that is opposite the first direction, the brake pad disengages from the braking surface;
a motor housing including a rotor, wherein the propeller ground stop mechanism is coupled to an exterior surface of the rotor via the second element;
the braking surface provided around the rotor; and
a propeller coupled to the rotor, wherein the propeller ground stop mechanism provides a braking torque to the propeller through the rotor.

19. The system of claim 18, wherein the brake pad faces outwardly toward the braking surface.

20. The system of claim 18, further comprising:
an aircraft including the propeller, the propeller ground stop mechanism, the braking surface, and the motor housing.

* * * * *